(12) United States Patent
Okita

(10) Patent No.: US 9,152,639 B2
(45) Date of Patent: Oct. 6, 2015

(54) METHOD AND APPARATUS TO TRANSFER FILE DATA TO A CLOUD ENVIRONMENT

(71) Applicant: Hideki Okita, Sunnyvale, CA (US)

(72) Inventor: Hideki Okita, Sunnyvale, CA (US)

(73) Assignee: HITACHI, LTD., Tokyo (JP)

(*) Notice: Subject to any disclaimer, the term of this patent is extended or adjusted under 35 U.S.C. 154(b) by 35 days.

(21) Appl. No.: 13/734,713

(22) Filed: Jan. 4, 2013

(65) Prior Publication Data

US 2014/0195572 A1     Jul. 10, 2014

(51) Int. Cl.
*G06F 17/30*     (2006.01)

(52) U.S. Cl.
CPC ........ *G06F 17/30073* (2013.01); *G06F 17/302* (2013.01); *G06F 17/30197* (2013.01)

(58) Field of Classification Search
USPC .................................................. 707/748, 827
See application file for complete search history.

(56) References Cited

U.S. PATENT DOCUMENTS

| | | | | |
|---|---|---|---|---|
| 2006/0187910 A1* | 8/2006 | Franz et al. | ................... | 370/389 |
| 2008/0101396 A1* | 5/2008 | Miyata | ......................... | 370/408 |
| 2009/0028169 A1* | 1/2009 | Bear et al. | ..................... | 370/406 |
| 2009/0041039 A1* | 2/2009 | Bear et al. | ..................... | 370/401 |
| 2009/0069642 A1* | 3/2009 | Gao et al. | ...................... | 600/300 |
| 2009/0129264 A1* | 5/2009 | Bugenhagen et al. | ........ | 370/230 |
| 2009/0233610 A1* | 9/2009 | Paetsch | ......................... | 455/445 |
| 2010/0333116 A1 | 12/2010 | Prahlad et al. | | |
| 2011/0170555 A1* | 7/2011 | Miyata | .......................... | 370/401 |
| 2013/0010621 A1* | 1/2013 | Yoshiuchi et al. | ............ | 370/252 |
| 2013/0212214 A1* | 8/2013 | Lawson et al. | ................ | 709/217 |
| 2013/0286830 A1* | 10/2013 | Xu et al. | ...................... | 370/232 |

* cited by examiner

*Primary Examiner* — Kim Nguyen
(74) *Attorney, Agent, or Firm* — Procopio, Cory, Hargreaves & Savitch LLP

(57) ABSTRACT

Systems and methods are directed to a file storage system that manages configuration information for each cloud gateway's storage device. Systems and methods also manage a configuration parameter; and a file transfer slot number, which represents how many HTTP sessions the cloud gateway can process substantially simultaneously. Based on the configuration information, systems and methods may prioritize the multiple cloud gateways. Systems and methods calculate time lengths weighted by the priorities of the cloud gateways and multiplied by the file-transfer slot number for each cloud gateway in a time period, and then allocate time slots of the cloud gateways in the time period according to the above calculated time lengths. Systems and methods therefore allow for automatically aligning the traffic between cloud gateways and cloud storage according to the configuration of cloud gateways.

15 Claims, 16 Drawing Sheets

Cloud gateway configuration information

| Cloud gateway ID | Volume | Size | Archive | |
|---|---|---|---|---|
| cgw0 | Vol00 | 5TB | Yes | 501 |
| cgw0 | Vol01 | 5TB | Yes | 502 |
| cgw0 | Vol02 | 10TB | No | 503 |
| cgw1 | Vol11 | 5TB | Yes | 504 |
| cgw2 | Vol21 | 5TB | Yes | 505 |
|  |  |  |  | |

Fig. 5

Cloud gateway I/O statistics information

| Cloud gateway ID | Read GB/day | Write GB/day | |
|---|---|---|---|
| cgw0 | 0.2 | 1.0 | 601 |
| cgw1 | 0.1 | 0.5 | 602 |
| cgw2 | 0.1 | 0.5 | 603 |
|  |  |  | |

Network RTT information

| Cloud gateway ID | RTT |
|---|---|
| cgw0 | 10 ms |
| cgw1 | 10 ms |
| cgw2 | 20 ms |
|  |  |

File transfer priority information

| Cloud gateway ID | Priority |
|---|---|
| cgw0 | 100 |
| cgw1 | 50 |
| cgw2 | 50 |

Fig. 9

File transfer timing information

| Cloud gateway ID | Allocated time | Start time | End time |
|---|---|---|---|
| cgw0 | 24 hrs | 00:00 | 24:00 |
| cgw1 | 12 hrs | 00:00 | 12:00 |
| cgw2 | 12 hrs | 12:00 | 24:00 |

Fig. 10

METHOD AND APPARATUS TO TRANSFER FILE DATA TO A CLOUD ENVIRONMENT

BACKGROUND

1. Technical Field

Methods and example implementations described herein are generally directed to storage area network (SAN) storage systems, and specifically, for cloud storage systems.

2. Related Art

Network Attached Storage (NAS) systems are emerging in the enterprise IT (Information Technology) systems to store unstructured data files (e.g., document, figures, voice, movie, etc.). By using the NAS, enterprise users can share the unstructured data files on their enterprise computer network. The NAS uses standard file access protocols such as the Network File System (NFS) protocol or the Common Internet File System (CIFS) protocol to receive file read/write requests from their client computers and to reply the requested files. NAS systems can be implemented in a cloud, where storage and other functions are stored in one or more outside servers rather than on the client device.

In view of the extensibility of the network attached storage system, the related art cloud storage system was developed. The cloud storage system may include a set of one or multiple cloud gateways and one or multiple cloud storage devices. The cloud gateways are located in user sites and act as general NAS devices. Such cloud storage devices are located in external sites such as remote sites of the users or cloud services. The cloud gateways transfer the file data stored in them to the cloud storage devices according to their configurations. For example, when the total size of data stored in a cloud gateway exceeds the pre-configured threshold for total data size, the cloud gateway transfers the least accessed file into a cloud storage device that is designated as a target device for the cloud gateway. The cloud storage device then keeps mapping information between the metadata of the transferred file and the actual location of the file.

However, when the number of the cloud gateways that designate the same cloud-storage device increases, the throughput of the cloud storage device will decrease. The multiple Hyper Text Transfer Protocol/Hyper Text Transfer Protocol Secure (HTTP/HTTPS) sessions may cause congestion in a network between the cloud gateways and the cloud-storage device. The congestion reduces data transfer rate of the HTTP sessions due to the congestion control mechanism of the Transmission Control Protocol (TCP) layer. As a result, the total throughput of the cloud-storage device is reduced. Also, the multiple overlapped HTTP sessions may exhaust HTTP processing capacity of the cloud-storage device. Thus, in the same way, throughput of the cloud-storage device will be reduced.

SUMMARY

Aspects of the present application may include a storage system communicatively coupled to a plurality of cloud gateways via a network, and configured to transfer data via the cloud gateways. The storage system may involve a management unit; and a memory configured to store information for each of the plurality of cloud gateways; wherein the management unit determines a priority for each cloud gateway based on the information.

Aspects of the present application may include a computer readable storage medium storing instructions for executing a process. The instructions may involve storing information of each of a plurality of cloud gateways; and determining a priority for each of the plurality of cloud gateways based on the information.

Aspects of the present application may include a method for managing a plurality of cloud gateways, which can involve storing information of each of a plurality of cloud gateways; and determining a priority for each of the plurality of cloud gateways based on the information.

BRIEF DESCRIPTION OF THE DRAWINGS

FIG. 5 illustrates an example of the structure of the cloud gateway configuration information of the cloud storage in a file storage system, in accordance with an example implementation.

FIG. 6 illustrates an example of the structure of the file I/O statistics information of the cloud storage of a file storage system, in accordance with an example implementation.

FIG. 7 illustrates an example of the structure of the network Round Trip Time (RTT) information of a file storage system, in accordance with an example implementation.

FIG. 9 illustrates an example of the structure of the file transfer priority information of a file storage system, in accordance with an example implementation.

FIG. 10 illustrates an example of the structure of the file transfer timing information of a file storage system, in accordance with an example implementation.

DETAILED DESCRIPTION

The example implementations described herein attempt to address the above described problems of the related art, and to improve the total throughput of the cloud-storage device having a large number of cloud gateways.

Related art storage systems have a problem that as the number of cloud gateways in the system increases, the throughput growth of the cloud storage is suppressed due to congestion of multiple Hyper Text Transfer Protocol (HTTP) sessions in a network and exhausting the cloud storage's capacity of HTTP/TCP communication. To address the problem, example implementations of the present application provide a file storage system that manages configuration information for each cloud gateway's storage device. The example implementations also manage a configuration parameter; and a file transfer slot number, which represents how many HTTP sessions the cloud gateway can process simultaneously. Based on the configuration information, example implementations prioritize the multiple cloud gateways. The example implementations calculate time lengths weighted by the priorities of the cloud gateways and multiplied by the file-transfer slot number for each cloud gateway in a time period, and then allocate time slots of the cloud gateways in the time period according to the above calculated time lengths. The example implementations therefore allow for automatically aligning the traffic between cloud gateways and cloud storage according to the configuration of cloud gateways.

First Example Implementation

Storage Size Based Time Slot Allocation

In a first example implementation, a storage system is configured to allocate a time slot for each cloud gateway based on a size of a storage component of each cloud gateway.

Figure 1:
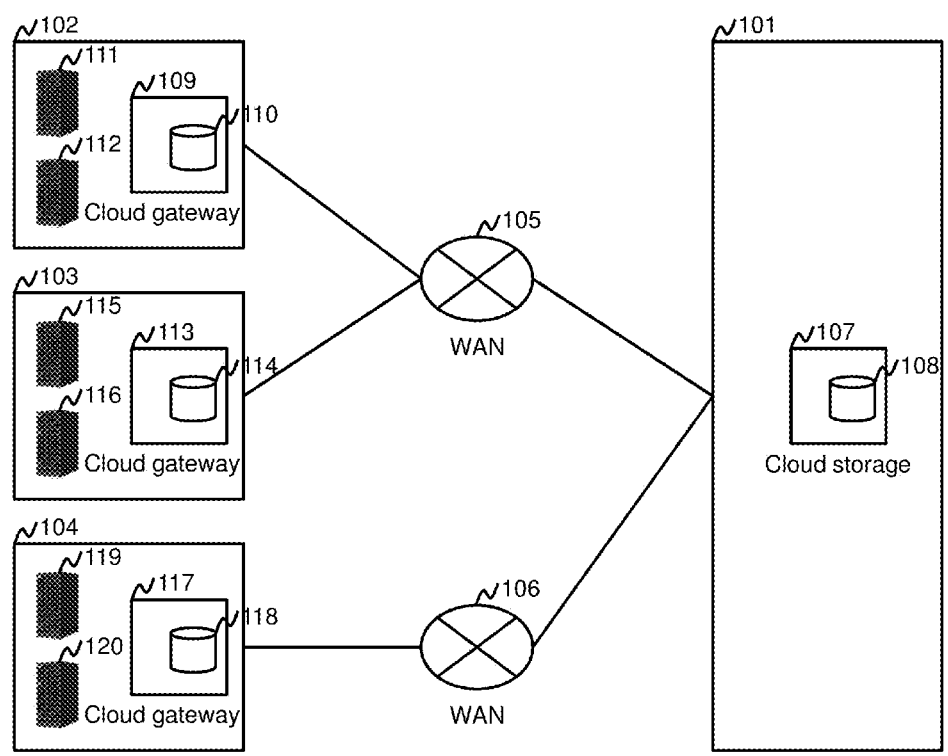
FIG. 1 illustrates an example of a network with a file storage system, in accordance with an example implementation.

FIG. 1 illustrates an example of a network with a file storage system, in accordance with an example implementation. The system may include a cloud-storage (e.g. storage system) 107, client sites 102, 103, 104 and cloud site 101. The system may also include one or multiple cloud gateways 109, 113, and 117. The cloud-storage and gateways are connected each other by wide-area networks (WANs) 105, and 106. The cloud storage and gateways have internal storage components 108, 110, 114, and 118. User clients 111, 112, 115, 116, 119,120 are located in user sites closer to the cloud gateways 109, 113, and 117.

Figure 2:
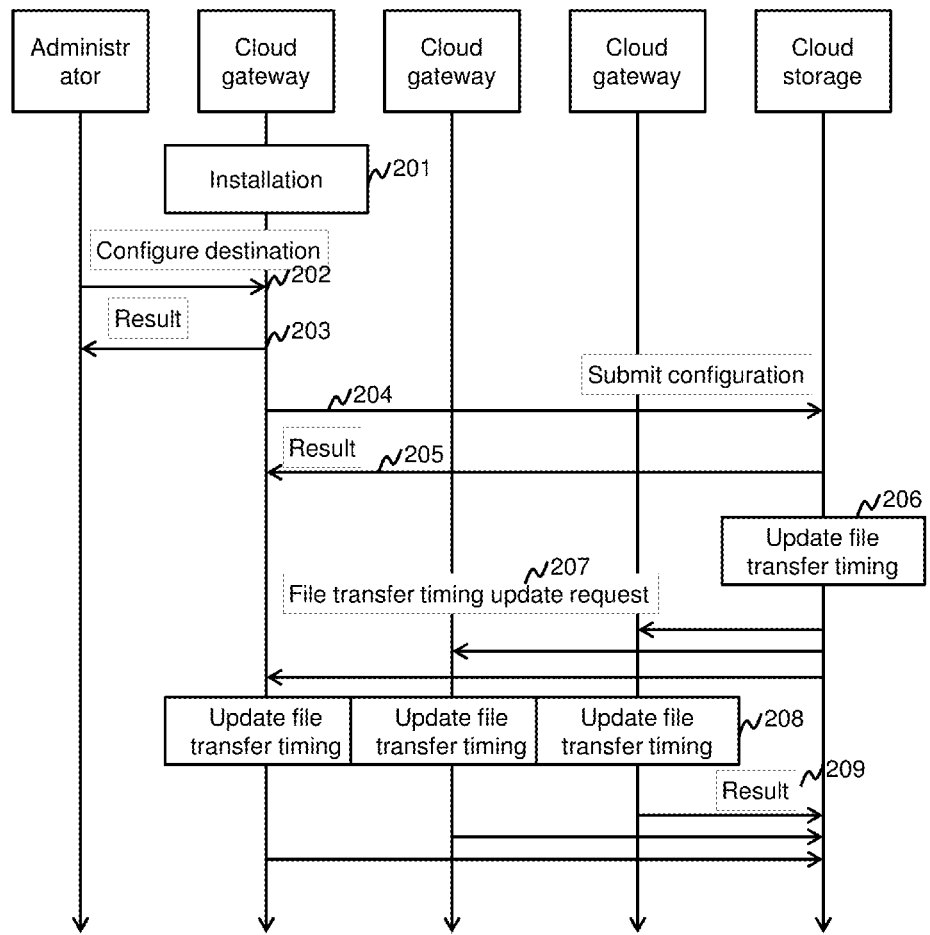
FIG. 2 illustrates an example of a message sequence of a file storage system, in accordance with an example implementation.

FIG. 2 illustrates an example of a message sequence of file storage system, in accordance with an example implementation. After an administrator of the system installs the third cloud gateway 117 to the system (201), the administrator configures the destination of the file transfer by the cloud gateway 117 (202) and obtain the result of the configuration (203). Then, the cloud gateway 117 starts the submission process. The cloud gateway 117 sends a message to submit the cloud gateway's configuration information including the total size of its internal storage devices, to the cloud storage 107 (204). Cloud gateway 117 then receives the result of the submission (205).

The cloud storage may operate as a management unit in an example implementation. For example, the cloud storage 107 updates the file transfer timing according to the information about cloud gateway storage size (206). The cloud storage 107 sends requests to the cloud gateways that require file transfer timing to the cloud storage 107 (207). The cloud gateways that receive the request update their file-transfer timing (208). Finally, the cloud storage 107 receives the update results of their file-transfer timing (209).

Figure 3:
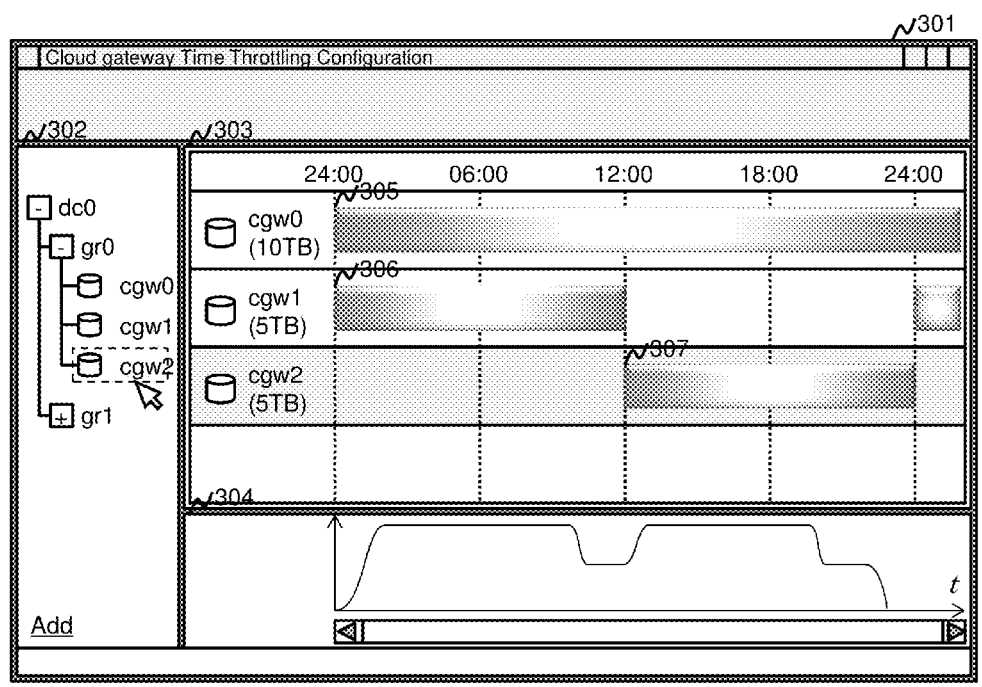
FIG. 3 illustrates an example of a user interface of a file storage system, in accordance with an example implementation.

FIG. 3 illustrates an example of a user interface of a file storage system, in accordance with an example implementation. FIG. 3 illustrates a list of managed cloud gateways in a left pane 302, as well as time slots allocated for each of the cloud gateways 109, 113, and 117 in the upper-right side pane 303. FIG. 3 also illustrates the transition of the actual traffic amount the cloud storage 107 has received in the lower-right side pane 304. In the pane 303, rows show time slots 305~307 allocated for the cloud gateways.

Figure 4:
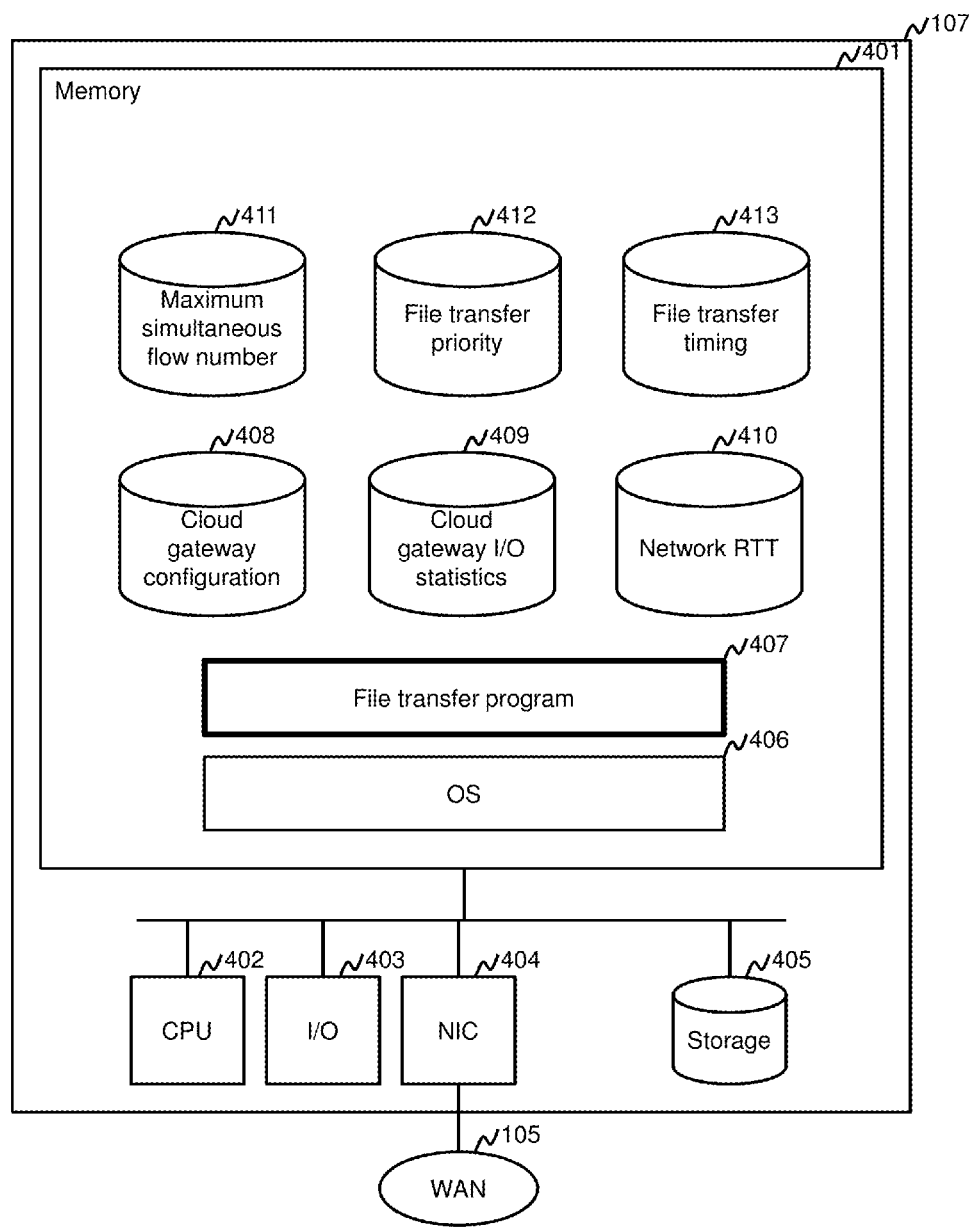
FIG. 4 illustrates an example of hardware and software architecture of the cloud storage of a file storage system, in accordance with an example implementation.

FIG. 4 illustrates an example of hardware and software architecture of the cloud storage 107 of a file storage system, in accordance with an example implementation. The cloud storage 107 may involve a memory 401, a central processing unit (CPU) 402, an input/output unit (I/O) 403, a network interface controller (NIC) 404, and an internal storage 405. The memory 401 stores an operating system (OS) 406 and a file transfer program 407. The memory also stores cloud gateway configuration information 408, cloud gateway I/O statistics 409, network RTT information 410, and maximum simultaneous flow number information 411, file transfer priority information 412, and file transfer timing information 413. The NIC 404 is connected to the WAN 105 and 106.

The file transfer program 407 enables the cloud storage 107 to work as an HTTP-based object storage that receives file transferred from the cloud gateways 109, 113, and 117.

The memory may be in the form of a computer readable storage medium that stores instructions for executing a process. Computer readable storage mediums include tangible storage medias such as random access memory (RAM), Hard Disk Drive (HDD), CD/DVDs, flash memory and the like. Alternatively, the elements as illustrated in memory 401 may be stored in a computer readable signal medium instead of a memory 401, which may include non-tangible storage media such as carrier waves.

FIG. 5 illustrates an example of the structure of the cloud gateway configuration information 408 of the cloud storage 107 in a file storage system, in accordance with an example implementation. The cloud gateway configuration information 408 is implemented as a table. Each row 501~505 of the table 408 represents a storage volume 110, 114, or 118 of a cloud gateway 109, 113, or 117. Each row 501~505 may include an identifier of a cloud gateway, an identifier of a storage volume, a size of the storage volume, and a flag of the status of archiving feature.

The cloud storage 107 can utilize the cloud gateway configuration information to manage the configuration of storage volumes 110, 114, and 118 of respective cloud gateways 109, 113, and 117 as reference information for calculating the priorities for each cloud gateway 109, 113, and 117.

FIG. 6 illustrates an example of the structure of the file I/O statistics information 409 of the cloud storage 107 of a file storage system, in accordance with an example implementation. In the example of FIG. 5, the cloud gateway I/O statistics information 409 is implemented as a table. Each row 601~603 of the table 409 represents a cloud gateway 109, 113, or 117. Each row 601~603 may include an identifier of a cloud gateway 109, 113, or 117, the total amount of data that the corresponding cloud gateway 109, 113, or 117 has read from the cloud storage 107 during a past day, and the total amount of data that the corresponding cloud gateway 109, 113, or 117 has written into the cloud storage 107 during a past day.

The cloud storage 107 can utilize the file I/O statistics information to manage the cloud gateway I/O statistics of cloud gateway 109, 113, or 117 as reference information for calculating priorities for each cloud gateway 109, 113, 117.

FIG. 7 illustrates an example of the structure of the network Round Trip Time (RTT) information 410 of a file storage system, in accordance with an example implementation. The network RTT information 410 is implemented as a table. Each row 701~703 of the table 410 represents a cloud gateway 109, 113, or 117. Each row 701~703 may include an identifier of a cloud gateway 109, 113, or 117, a round-trip time (RTT) between a correspond cloud-gateway 109, 113, or 117 and the cloud storage 107.

The cloud storage 107 can utilize the RTT information to manage the network RTT for each cloud gateway 109, 113, or 117 as reference information for calculating priorities for each cloud gateway 109, 113, or 117.

Figure 8:
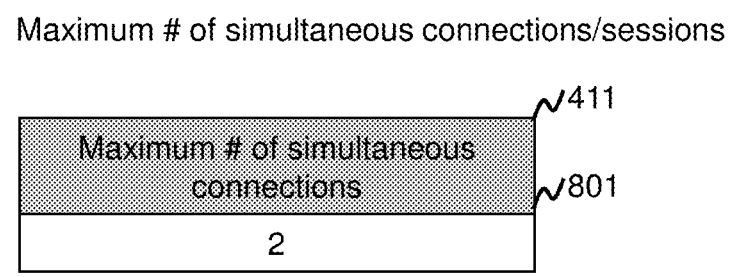
FIG. 8 illustrates an example implementation of the structure of the file transfer slot number of a file storage system, in accordance with an example implementation.

FIG. 8 illustrates an example implementation of the structure of the file transfer slot number of a file storage system, in accordance with an example implementation. The file transfer slot number is implemented as a variable 801 and stores an integer. The stored integer indicates the maximum number of HTTP connections/sessions that the cloud storage 107 can process simultaneously with the cloud gateway 109, 113, and 117. The administrator configures this parameter according to the capacity of cloud storage and the available network bandwidth for file transfer from the cloud gateway 109, 113, and 117.

The administrator can adjust the amount of incoming and outgoing traffic for the cloud storage 107 based on the file transfer slot number. In the example of FIG. 8, the variable of the file transfer slot number is set to two, indicating that the cloud storage 107 can process up to two HTTP connections/sessions simultaneously.

FIG. 9 illustrates an example of the structure of the file transfer priority information 412 of a file storage system, in accordance with an example implementation. The file transfer priority information 412 is implemented as a table in the example of FIG. 9. Each row 901~903 of the table 412 represents a cloud gateway 109, 113, or 117. Each row 901~903 may include an identifier of a cloud gateway 109, 113, or 117, a priority calculated for each cloud gateway 109, 113, or 117. In the example implementation, a higher value of this variable indicates a higher priority. The processes for calculating the priority may differ depending on the desire implementation. The file transfer priority information is indicative of time slot division.

The cloud storage 107 can utilize the file transfer priority information to store intermediate variables utilized for allocating a time slot for file transfer by each cloud gateway 109, 113, or 117. In the example of FIG. 9, the cloud gateway 109 named "cgw0" has higher priority, and the cloud gateway 113 and 117 has the same and lower priority, respectively.

FIG. 10 illustrates an example of the structure of the file transfer timing information 413 of a file storage system, in accordance with an example implementation. The file transfer timing information 413 is implemented as a table. Each row 1001~1003 of the table 413 represents a cloud gateway 109, 113, or 117. Each row 1001~1003 may include an identifier of the cloud gateway 109, 113, or 117, a time length allocated for correspond cloud gateway 109, 113, or 117, a start time of the allocated time slot, an end time of the allocated time slot. The file transfer timing information may include multiple entries for multiple time slots (consecutive or non-consecutive), depending on the desired implementation.

The cloud storage 107 can utilize the file transfer timing information to store intermediate variables utilized for configuring the cloud gateway 109, 113, and 117. In the example of FIG. 10, the cloud gateway 109 named "cgw0", 113 named "cgw1", and 117 named "cgw2" are allocated with 24 hours of slot time, 12 hours of slot time, and 12 hours of slot time, respectively. The time lengths of the slots are weighted according to the priorities stored in the file transfer priority information 412.

Figure 11:
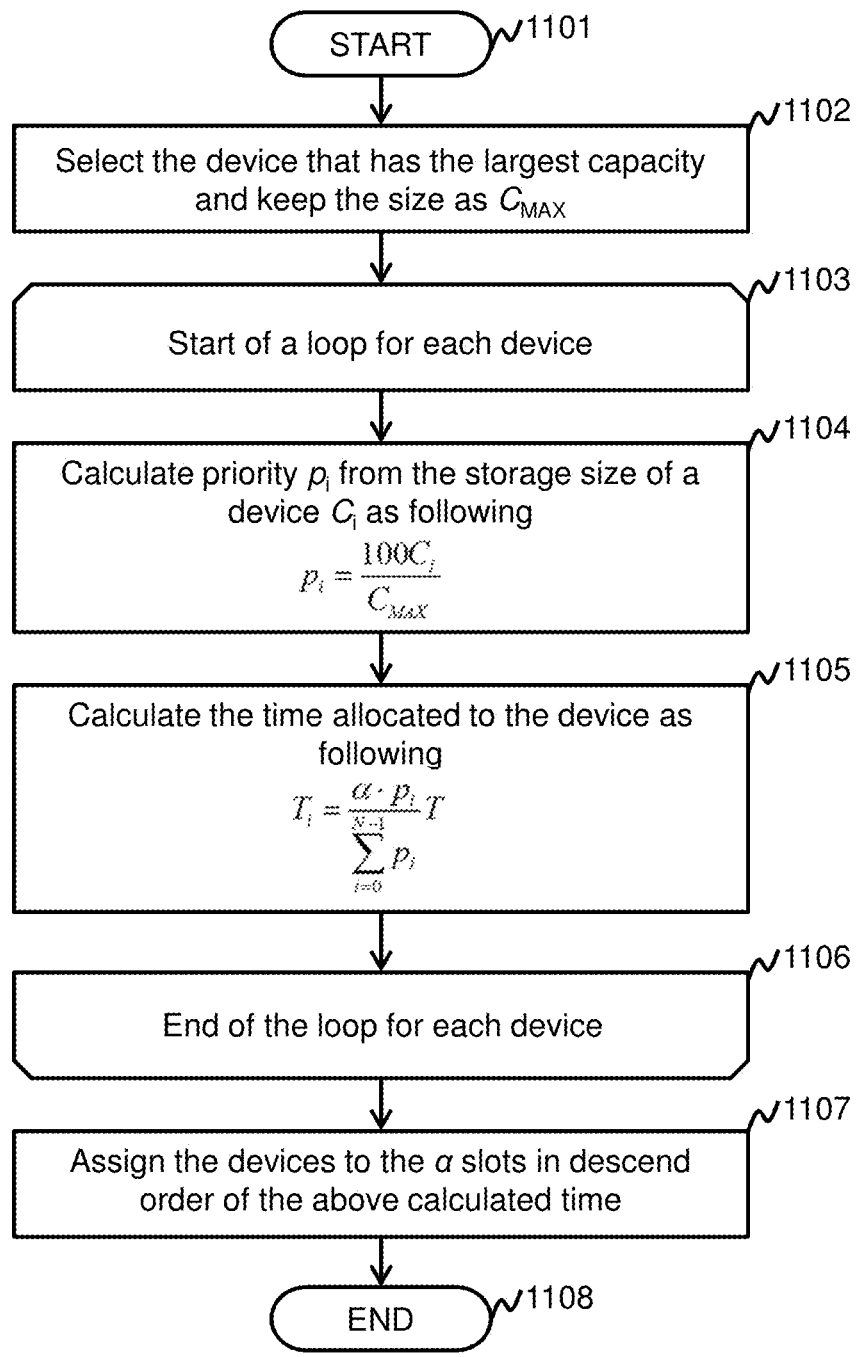
FIG. 11 illustrates an example of a flow diagram of the file transfer program of the cloud storage of a file storage system, in accordance with an example implementation.

FIG. 11 illustrates an example of a flow diagram of the file transfer program 407 of the cloud storage 107 of a file storage system, in accordance with an example implementation. At the start of the flow diagram (1101), the file transfer program 407 selects the device that has the largest storage capacity from the cloud gateway configuration information 408. The file transfer program then keeps the total size of storage components of the selected device as $C_{MAX}$ (1102). When the total size is calculated for each cloud gateway 109, 113, or 117, the sizes of the storage components that have an archiving flag activated are summed.

In the example of FIG. 11, the rows 501 and 502 are used to calculate the total storage size of the cloud gateway 109 named "cgw0", and summed up to 10 TB. The storage sizes are calculated as $C_0$=10 TB for cloud gateway 109, $C_1$=5 TB for cloud gateway 113, and $C_2$=5 TB for cloud gateway 117. The largest size is selected as $C_{MAX}=C_0$=10 TB.

The file transfer program 407 starts a loop for each cloud gateway 109, 113, or 117 (1103). In this loop, the file transfer program calculates a priority $p_i$ for a cloud gateway 109, 113, or 117 according to the storage size of the corresponding cloud gateway by the following expression; $p_i$=100 $C_i/C_{MAX}$ (1104). The priority is proportional to the storage size. In the example of FIG. 11, the priorities are calculated as $p_0$=100, $p_1$=50, $p_2$=50 for cloud gateway 109, 113, and 117, respectively as shown as FIG. 9.

The file transfer program 407 calculates the time length allocated to the corresponding cloud gateway 109, 113, or 117 according to the above calculated priority by the following expression; $T_i=\alpha \cdot p_i\, T/\Sigma\, p_i$ (i={0, N−1}) (1105). The time length is proportional to the priority and the time length is multiplied by the file transfer slot number. In the example of FIG. 11, the time lengths are calculated as $T_0$=24 hours, $T_1$=12 hours, $T_2$=12 hours for cloud gateway 109, 113, and 117, respectively, as shown in FIG. 10.

After finishing the calculation for all cloud gateways, the file transfer program 407 ends the loop for each cloud gateway (1106).

The file transfer program 407 decides on the start time of a time slot for each cloud gateway according to each time length (1107). The file transfer program aligns the time slots on the timeline in descending order of the time length of the time slot. Further, the file transfer program aligns multiple time slots simultaneously by the variable of the above a, the file maximum simultaneous flow number 411.

After finishing the alignment of the time slots, the file transfer program 407 ends the flow diagram (1108).

Second Example Implementation

Access Rate Based Time Slot Allocation

In a second example implementation, a storage system allocates a time slot for each cloud gateway based on an access rate to the storage component of each cloud gateway.

Figure 12:
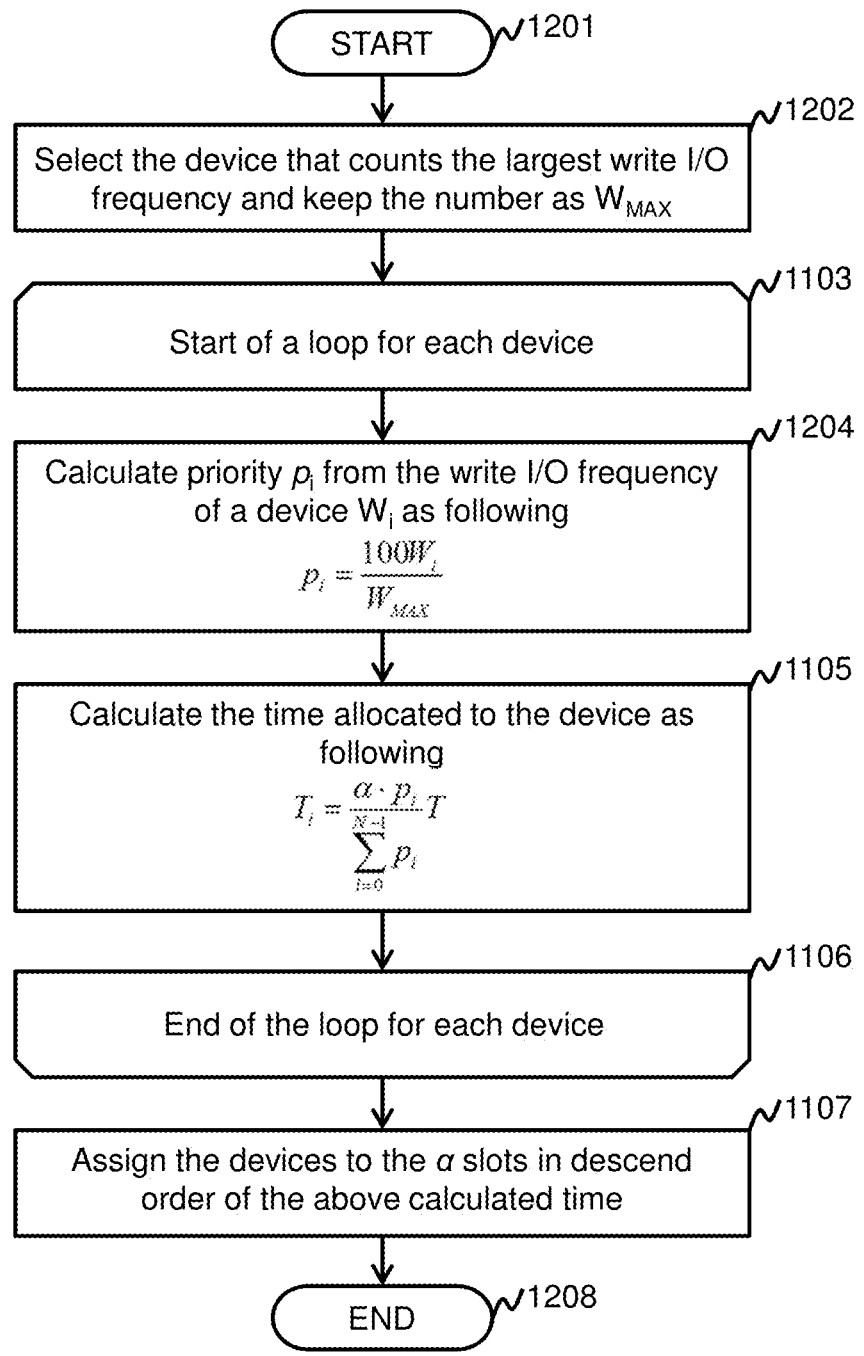
FIG. 12 illustrates an example of the flow diagram of the file transfer program in a second example implementation of a file storage system.

FIG. 12 illustrates an example of the flow diagram of the file transfer program 407 in a second example implementation of a file storage system. In a second example implementation, the same network architecture as shown in FIG. 1 and the same hardware and software architecture as shown in FIG. 4 may be utilized, while inheriting the structure of the management information stored in the cloud storage.

The flow diagram is substantially similar to the first example implementation illustrated in FIG. 11 except with a different method to calculate the priorities of the cloud gateways 109, 113, and 117. At the start of this flow diagram (1201), the file transfer program 407 selects the cloud gateway that has the largest write I/O frequency from the cloud gateway I/O statistics information 409 and keeps its variable as $W_{MAX}$ (1202). Also, the file transfer program 407 calculates the priority $p_i$ for each cloud gateway 109, 113, or 117 according to the write I/O frequency of the cloud gateway 109, 113, or 117 by the following equation; $p_i=100\,W_i/W_{MAX}$ (1204). The priority is proportional to the write I/O frequency.

Third Example Implementation

RTT Based Time Slot Allocation

In a third example implementation, a storage system allocates a time slot for each cloud gateway based on a round-trip time (RTT) between the cloud-storage device and each cloud gateway.

Figure 13:
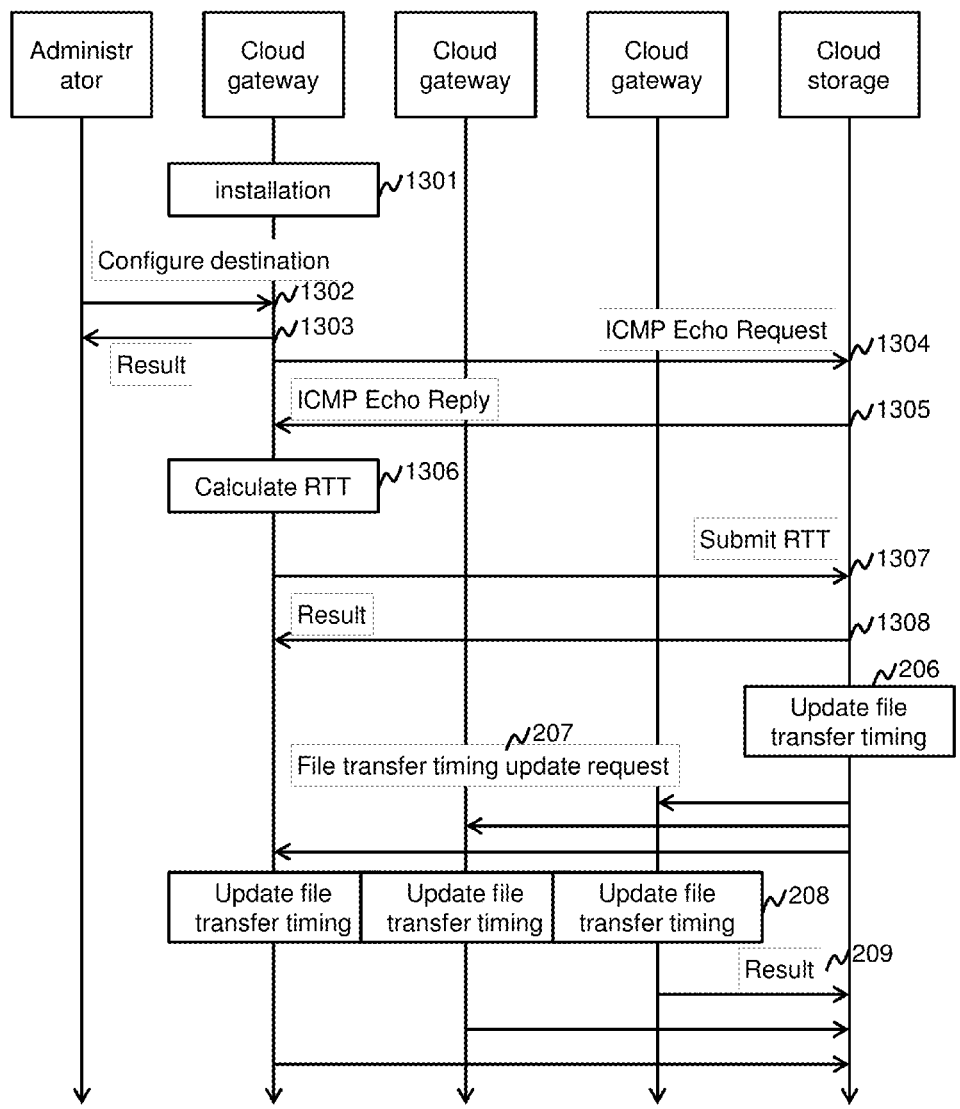
FIG. 13 illustrates an example of a message sequence in a third example implementation of a file storage system.

FIG. 13 illustrates an example of a message sequence in a third example implementation of a file storage system. In a third example implementation, the cloud storage 107 controls file transfer timing according to a RTT between the cloud storage 107 and a cloud gateway 109, 113, or 117. The third example implementation also utilizes the same network architecture shown in the FIG. 1 and the same hardware and software architecture as shown in FIG. 4, while also inheriting the structure of the management information stored in the cloud storage.

In the message sequence of FIG. 13, after the installation of a cloud gateway 117 (1301), an administrator of the system configures the destination of file transfer by the installed cloud gateway (1302), and receives the configuration result (1303). Then the cloud gateway 117 sends an ICMP Echo request to the designated cloud storage 107 (1304) and receives an ICMP Echo reply (1305). According to the ICMP Echo reply from the cloud storage 107, the cloud gateway 117 calculates an RTT (1306). The cloud gateway 117 sends a message submitting the calculated RTT to the cloud storage 107 (1307) and receives the result of the submission (1308). The remaining portions of the message sequence can be implemented similarly to FIG. 2, depending on the desired implementation.

Figure 14:
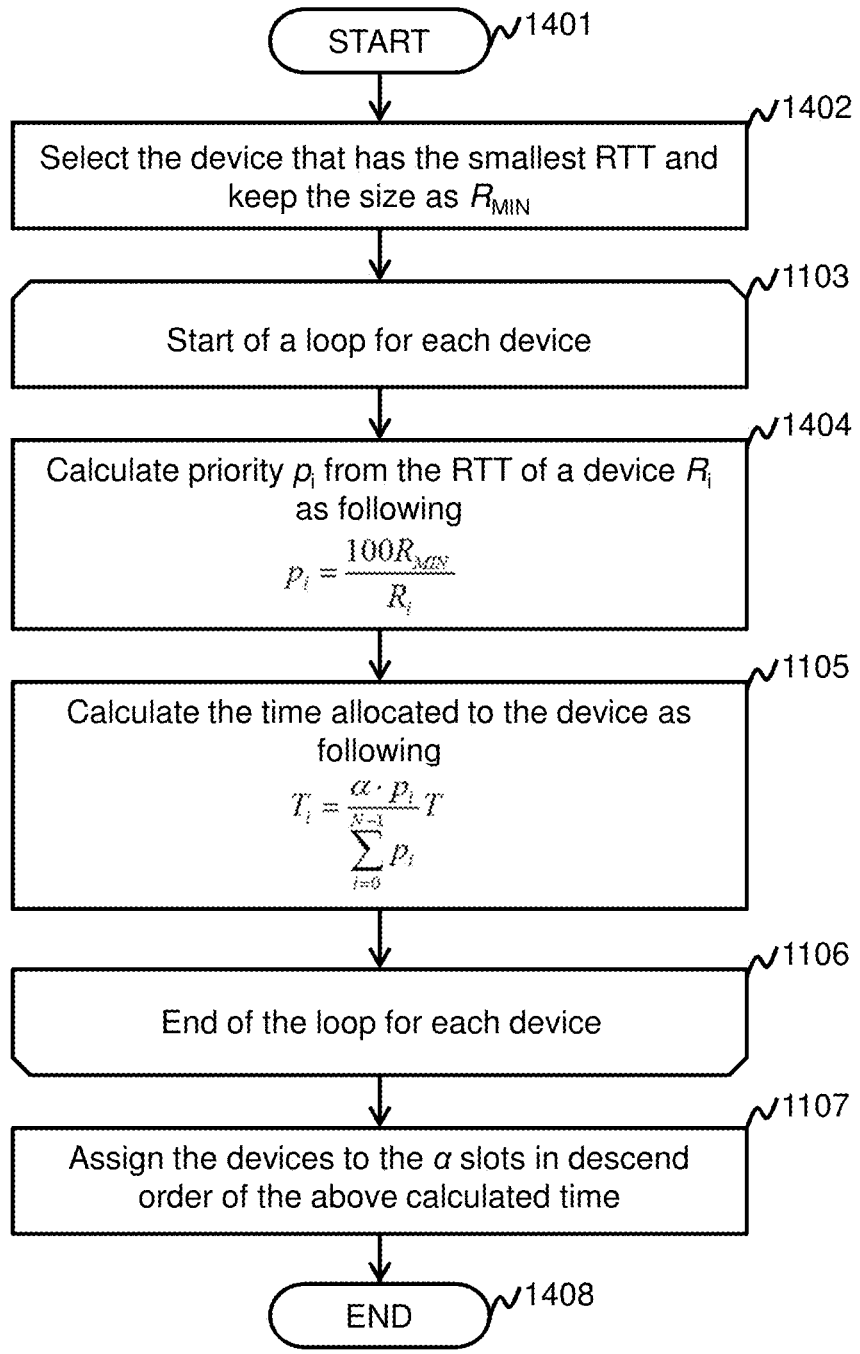
FIG. 14 illustrates an example of the flow diagram of the file transfer program in a third example implementation of a file storage system.

FIG. 14 illustrates an example of the flow diagram of the file transfer program 407 in a third example implementation of a file storage system.

The flow diagram is similar to the first example implementation illustrated in FIG. 11, with a different method to calculate the priorities of the cloud gateways 109, 113, and 117. At the start of the flow diagram (1401), the file transfer program 407 selects the cloud gateway that has the smallest RTT from the network RTT information 410 and keeps its variable as $R_{MIN}$ (1402). The file transfer program 407 calculates the priority $p_i$ for each cloud gateway 109, 113, or 117 according to the RTT of the cloud gateway 109, 113, or 117 by the following equation; $p_i=100\,R_{MIN}/R_i$ (1404). The priority is inversely proportional to the RTT.

Fourth Example Implementation

Separated Architecture

In a fourth example implementation, a storage system allocates a time slot as in the previous example implementations and includes, instead of the cloud-storage device, a file transfer manager which manages the configuration information of the cloud gateways and allocates the time slots for the cloud gateways. The file transfer manager may behave as a management unit for the cloud-storage device.

Figure 15:
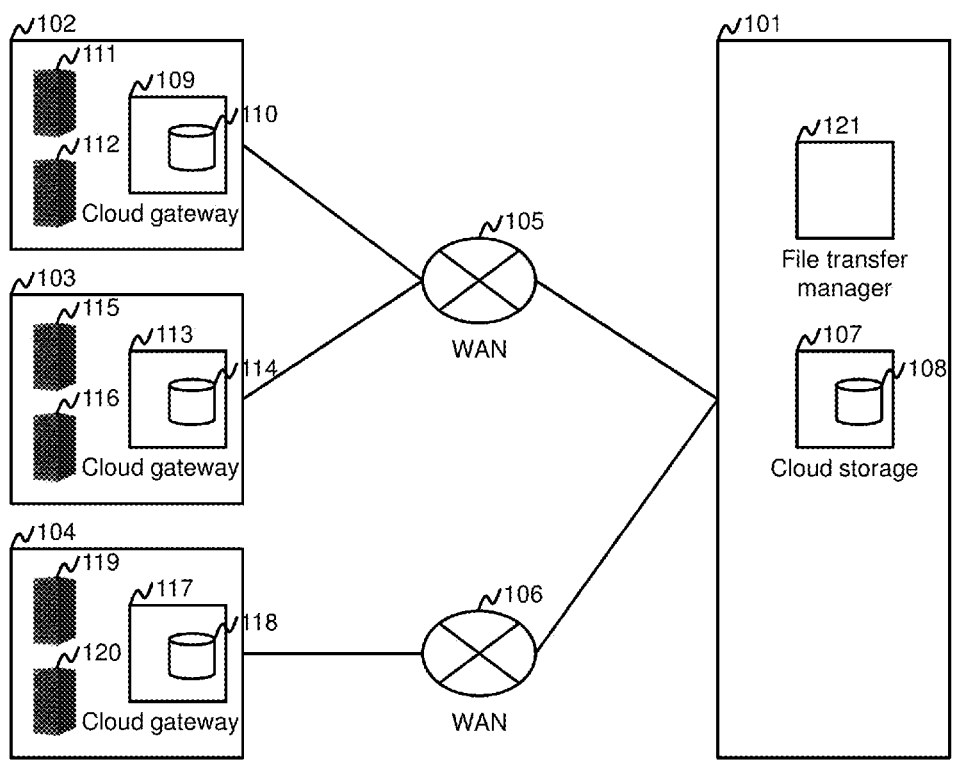
FIG. 15 illustrates an example of a network in a fourth example implementation of a file storage system.

FIG. 15 illustrates an example of a network in a fourth example implementation of a file storage system. In addition to the components described in the first example implementation, a file transfer manager 121 is located in a cloud site 101 with the cloud storage 107. The file transfer manager 121 is configured to be able to connect to the cloud storage 107 and cloud gateways 109, 113, and 117. This example implementation illustrates an example of possible alternate system architecture. In this example implementation, the methods to control file transfer between the cloud gateway 109, 113, and 117 and the cloud storage 107 is processed by the file transfer manager 121.

Figure 16:
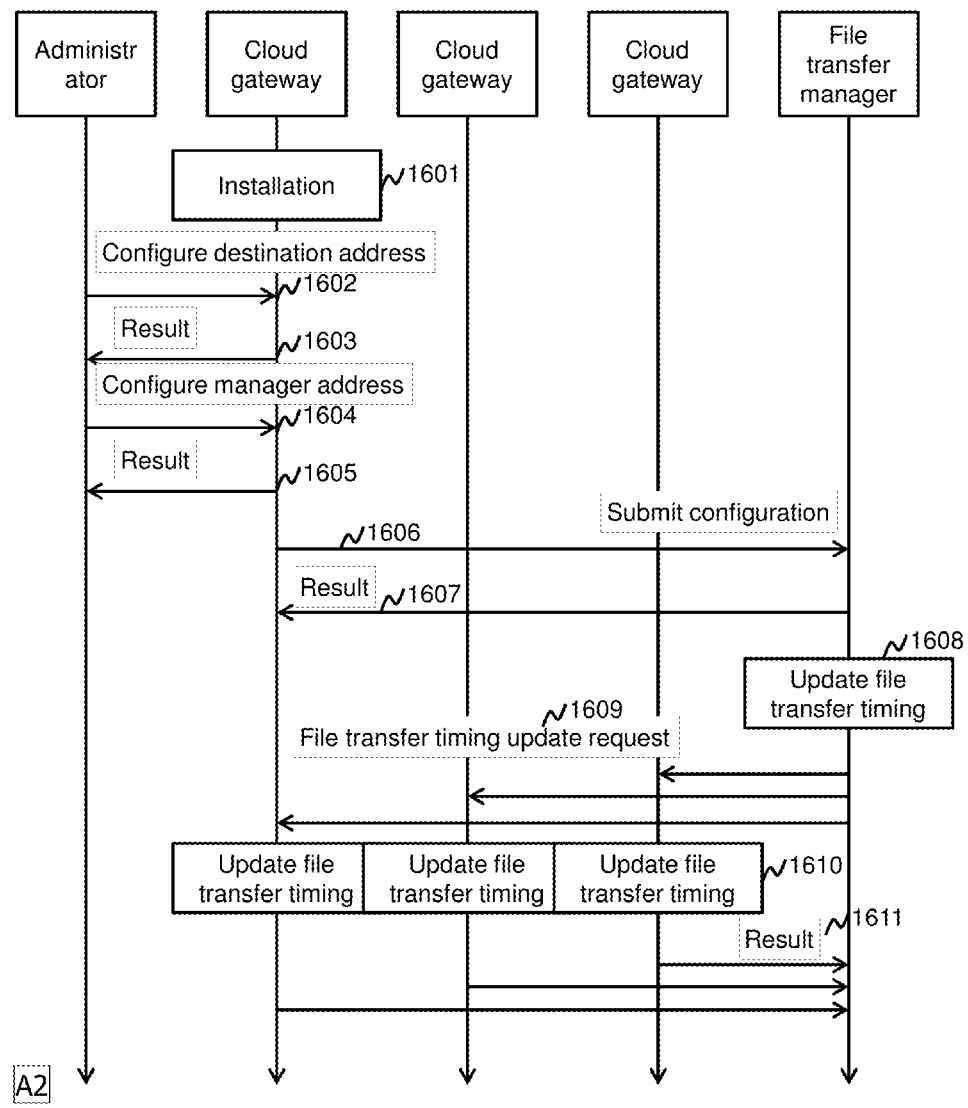
FIG. 16 illustrates an example of a message sequence in a fourth example implementation of a file storage system.

FIG. 16 illustrates an example of a message sequence in a fourth example implementation of a file storage system. The message sequence 1601-1611 is similar to that of FIG. 2, with some differences. The differences with the example implementation shown in the FIG. 2 are that the cloud storage 107 in the FIG. 2 is changed to the file transfer manager 121. Further, the administrator's configuration in the sequences 1602 and 1604 include not only a configuration of the destination of file transfer but also a configuration of an IP address of the file transfer manager 121 as the destination of the control path. The sequences 1604-1609 are processed with the file transfer manager 121.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A storage system communicatively coupled to a plurality of cloud gateways via a network, and configured to transfer data via the plurality of cloud gateways, the storage system comprising:
    a memory configured to store information for each of the plurality of cloud gateways, the information indicative of traffic between the each of the plurality of cloud gateways and the storage system; and
    a management unit that determines a priority for each of the plurality of cloud gateways based on the information indicative of the traffic between the each of the plurality of cloud gateways and the storage system, calculates time lengths weighted by the priorities of the each of the cloud gateways and multiplied by file transfer slots for each cloud gateway in a time period, and allocates time slots of the cloud gateways in the time period according to the calculated time lengths;
    wherein the storage system is configured to conduct the allocation of the data transfer timing to each of the plurality of cloud gateways based on a maximum number of simultaneous sessions.

2. The storage system of claim 1, wherein the information comprises a storage size of each of the plurality of cloud gateways.

3. The storage system of claim 1, wherein the information comprises an access rate of each of the plurality of cloud gateways.

4. The storage system of claim 1, wherein the information comprises a round-trip time (RTT) between each of the plurality of cloud gateways and the storage system.

5. The storage system of claim 1, wherein the information is received from at least one of the plurality of cloud gateways.

6. The storage system of claim 1, wherein the management unit is in a management server.

7. A non-transitory computer readable storage medium storing instructions for executing a process, the instructions comprising:
   storing information of each of a plurality of cloud gateways, the information indicative of traffic between the each of the plurality of cloud gateways and a storage system;
   determining a priority for each of the plurality of cloud gateways based on the information indicative of traffic between the each of the plurality of cloud gateways and the storage system;
   calculating time lengths weighted by the priorities of the each of the cloud gateways and multiplied by file transfer slots for each cloud gateway in a time period, and
   allocating time slots of the cloud gateways in the time period according to the calculated time lengths;
   wherein the allocating the data transfer timing to each of the plurality of cloud gateways is based on a maximum number of simultaneous sessions.

8. The non-transitory computer readable storage medium of claim 7, wherein the information comprises a storage size of each of the plurality of cloud gateways.

9. The non-transitory computer readable storage medium of claim 7, wherein the information comprises an access rate of each of the plurality of cloud gateways.

10. The non-transitory computer readable storage medium of claim 7, wherein the information comprises a round-trip time (RTT) between each of the plurality of cloud gateways and a storage system.

11. The non-transitory computer readable storage medium of claim 7, wherein the information is received from at least one of the plurality of cloud gateways.

12. A method of managing a plurality of cloud gateways, comprising:
   storing information of each of the plurality of cloud gateways, the information indicative of traffic between the each of the plurality of cloud gateways and a storage system;
   determining a priority for each of the plurality of cloud gateways based on the information indicative of traffic between the each of the plurality of cloud gateways and the storage system;
   calculating time lengths weighted by the priorities of the each of the cloud gateways and multiplied by file transfer slots for each cloud gateway in a time period, and;
   allocating time slots of the cloud gateways in the time period according to the calculated time lengths;
   wherein the allocating the data transfer timing to each of the plurality of cloud gateways is based on a maximum number of simultaneous sessions.

13. The method of claim 12, wherein the information comprises a storage size of each of the plurality of cloud gateways.

14. The method of claim 12, wherein the information comprises an access rate of each of the plurality of cloud gateways.

15. The method of claim 12, wherein the information comprises a round-trip time (RTT) between each of the plurality of cloud gateways and a storage system.

* * * * *